Dec. 5, 1933.  K. M. RONAN  1,937,596
TAIL WHEEL ASSEMBLY FOR AIRCRAFT
Filed Nov. 30, 1931
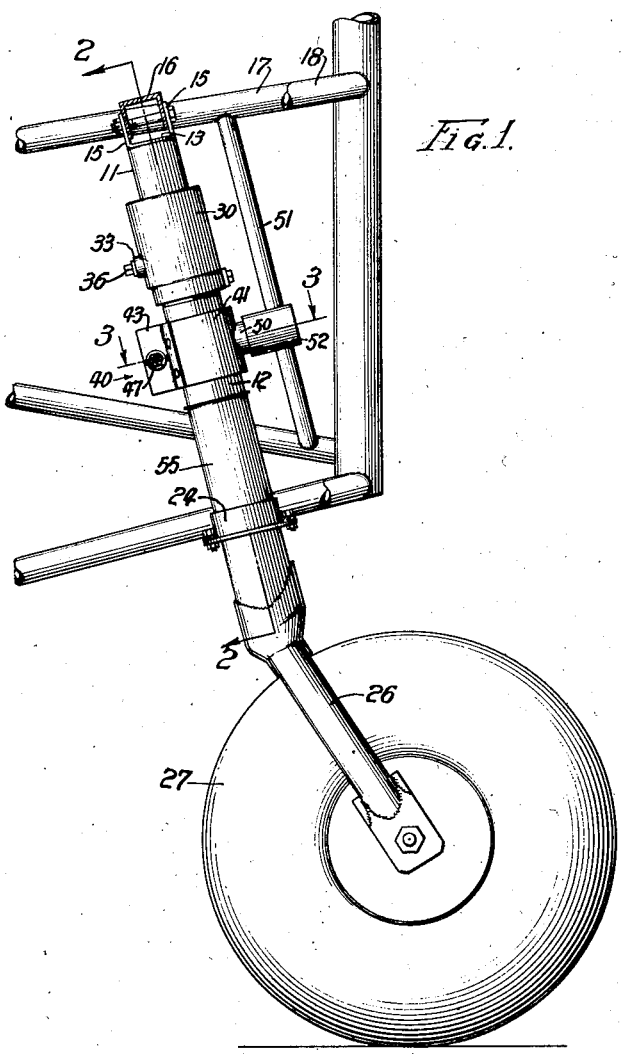
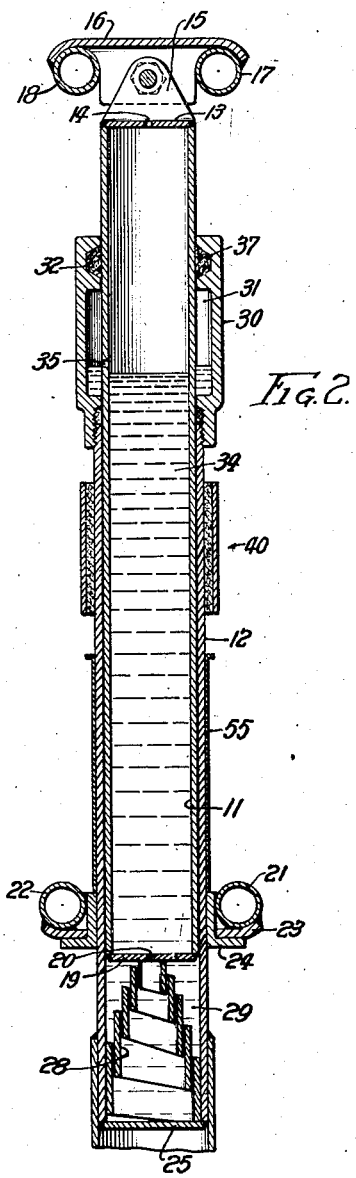
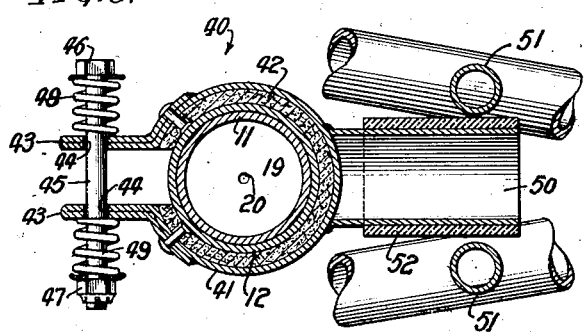
Inventor:
Kenneth M. Ronan,
By: Roy P. Anderson
Att'y.

Patented Dec. 5, 1933

1,937,596

UNITED STATES PATENT OFFICE 1,936,596

TAIL WHEEL ASSEMBLY FOR AIRCRAFT

Kenneth M. Ronan, Wayne, Mich., assignor to Stinson Aircraft Corporation, Wayne, Mich., a corporation of Michigan Application November 30, 1931
Serial No. 577,949

15 Claims. (Cl. 244—2)

This invention relates to aircraft and more particularly to a tail wheel assembly therefor, in which means is provided to absorb shocks incident to the landing and taxiing of the craft, and other means is provided to prevent oscillation or wabbling of the tail wheel both when the craft is in flight and when it is taxiing along the ground.

In the drawing wherein is illustrated a preferred embodiment of the invention—

Fig. 1 is a side elevation of the rear portion of an airplane showing a tail wheel assembly constructed in accordance with the present invention attached thereto;

Fig. 2 is a longitudinal sectional view taken on a plane indicated by the line 2—2 of Fig. 1; and Fig. 3 is a cross-sectional view taken on a plane indicated by the line 3—3 of Fig. 1.

Referring now more particularly to the drawing, the tail wheel assembly comprises in general an inner tubular member 11 and an outer tubular member 12 which are rotatably and telescopically associated. The inner tubular member 11 is provided with a top closure 13 having a port 14 therein, the purpose of which will later appear, and a pair of upstanding attaching lugs 15 which are adapted to be attached to a cross-member 16 secured to and extending between upper longerons 17 and 18. The inner tubular member is also provided with a bottom closure 19 having a restricted orifice 20 therein, the purpose of which will also appear later.

Secured to lower longerons 21 and 22 is a plate 23 to which is attached a bushing 24 within which the outer tubular member is journaled for both longitudinal and pivotal movement. From the foregoing it will be seen that the outer tubular member is longitudinally and pivotally movable with respect to both the bushing 24 and the inner tubular member 11, while the latter is held against rotative movement by its attachment to the cross-member 16 as above described.

The lower end of the outer tubular member 12 is provided with a closure plate 25 welded or otherwise secured thereto. Also secured to the lower end of the outer tubular member 12 is a fork 26 between the furcation of which is rotatably mounted a tail wheel 27.

In order to provide yieldable longitudinal movement between the inner and outer tubular members 11 and 12, a spiral spring 28 is disposed in a chamber 29 formed between the lower ends of the inner and outer tubular members and has its lower end engaging the lower end 25 of the outer tubular member and its upper end engaging the lower end 19 of the inner tubular member.

Threaded to the top of the outer tubular member and journaled upon the inner tubular member is a collar 30 which cooperates with the inner tubular member 11 to form annular chambers 31 and 32. The collar 30 is provided with a filler opening 33 for the introduction therethrough of a quantity of shock absorber oil or similar fluid 34 into chamber 31 from whence it flows through an opening 35 into the inner tubular member. Sufficient oil is introduced into the inner tubular member as to fill the chamber 29 between the lower ends of the inner and outer tubular members within which the spring 28 is disposed, and to rise in the inner tubular member to a height substantially equal to the height of the aperture 35 when the airplane is resting upon the ground. A plug 36 is provided for normally closing the filler opening 33. The shock absorber fluid 34 lends additional shock absorbing qualities to the tail wheel structure but is provided mainly to absorb severe shocks to which the tail of the craft is subjected, as during the landing of the airplane. Within the chamber 32 is a quantity of packing material 37 to prevent leakage of shock absorber oil and also to provide a wiper for wiping oil from the outer surface of the inner tubular member 11 during relative longitudinal movement between the inner and outer tubular members, and cause the oil to flow back into chamber 31.

To prevent excessive oscillation of the tail wheel 27 when the airplane is taxiing along the ground or when in flight, a brake 40 is provided which engages the outer tubular member just below the collar 30. The brake 40 comprises a metal strap 41 secured to the inner face of which is a band of any suitable friction material 42. The strap 41 is provided with lateral projections 43 having axially aligned apertures 44 through which is disposed a bolt 45 having a head 46 on one end and a nut 47 threaded on the opposite end thereof. Between the head 46 and the adjacent lateral projection 43 is disposed a spring 48 and a similar spring 49 is disposed between the nut 47 and the other lateral projection to provide yieldable gripping action of the brake band 42 upon the tubular member 12. By tightening or loosening the nut 47, the gripping action of the friction material may be varied to suit various conditions.

In order to prevent movement of the brake mechanism with pivotal movement of the wheel 27 and tubular member 12, the brake mechanism is provided with a rearwardly extending projection 50 welded or otherwise secured to the strap 41, which projection is disposed between a pair of upright members 51 of the frame of the fuselage. A piece of rubber hosing 52 or other similar resilient material is disposed on the projection 50 to prevent noisy bumping or rattling of the parts. The outside diameter of the hosing is slightly less than the distance between the uprights, thereby permitting only a slight lateral movement of the projection 50.

To prevent complete separation of the inner and outer tubular members 11 and 12 when the tail wheel assembly has been relieved of its load, a sleeve 55 is slidable and rotatably journaled on the outer tubular member between the brake mechanism 40 and the bushing 24. When the airplane is in flight the weight of the tail wheel and the spring 28 will cause a separation of the inner and outer tubular members 11 and 12, but this separation will be limited by the engagement of sleeve 55 with the brake member 40 at its upper end and the bushing 24 at its lower end. This separation of the two tubular members causes an enlargement of chamber 29 formed between the lower ends of the tubular members, and to accommodate this enlargement of the chamber 29 fluid will flow from the inner tubular member through the orifice 20, thereby lowering the level of the fluid in the inner tubular member. This flow of oil from the inner tubular member to the chamber 29 and vice versa is made possible by the aperture 14 which allows ingress and egress of air from the top of the inner tubular member to accommodate changes in volume of the air space above the surface of the shock absorber fluid.

After the tail wheel structure has been assembled and secured to the airplane as above described, the brake band is adjusted by means of the nut 47 to such a degree that it will allow rotation of the tubular member when the latter is subjected to a turning force of moderate or great magnitude such, for example, as the force imparted to it from the tail wheel when the latter is on the ground and the airplane on which it is mounted is making a turn while taxiing, but will prevent turning of the member when subjected to a force of lesser magnitude, such, for example, as the air pressure exerted upon the wheel when the airplane is in flight, and also prevent objectionable oscillation of the outer tubular member, and hence the tail wheel, during taxiing of the airplane.

When the plane is in flight the outer tubular member 12 is in its lowermost position, that is, the position it assumes when the brake mechanism 40 engages the upper end of sleeve 55 and the lower end of the sleeve engages the bushing 24, as above pointed out. Upon landing of the plane the tail wheel, coming into contact with the ground, forces the outer tubular member upwardly with respect to the inner tubular member, thus making the chamber 29 smaller and forcing oil through the restricted orifice 20. The effect of forcing the oil through the orifice 20 will be to cushion or absorb the shock incident to landing of the plane. In taxiing along the ground, the spiral spring 28 will afford the necessary resiliency to the tail wheel structure.

From the foregoing it will be seen that a simple tail wheel assembly has been provided which prevents objectionable oscillation of the tail wheel 27 during flight and taxiing, but allows for turning of the wheel 27 to accommodate changes in direction of travel of the plane while taxiing along the ground, and also provides the necessary and desirable shock absorbing qualities, both when the plane is landing and taxiing along the ground.

Although the foregoing description is necessarily of a detailed character in order to completely set forth the invention, it is to be understood that the specific terminology is not intended to be restrictive or confining, and it is to be further understood that various re-arrangements of parts and modifications of structural detail may be resorted to without departing from the scope or spirit of the invention as herein claimed.

Having thus described the invention, what is claimed and desired to secure by Letters Patent is:

1. A shock absorbing tail wheel assembly for aircraft comprising inner and outer relatively rotatable and telescopically associated tubular members having closed lower ends, the lower end of the inner member being disposed above the lower end of the outer member to form a chamber, the inner tubular member being fixed to the fuselage of the aircraft and the outer tubular member being rotatably and axially movable relative to said fuselage and carrying a tail wheel, means disposed in said chamber for providing resilient longitudinal movement between said members and means carried by said outer member and held against turning therewith for imposing a braking action thereon against a turning movement of said outer member upon said inner member.

2. A shock absorbing tail wheel assembly for aircraft comprising inner and outer relatively rotatable and telescopically associated tubular members having closed lower ends, the lower end of the inner member having a restricted aperture therein and being disposed above the lower end of the outer member to form a chamber, the inner tubular member being fixed to the fuselage of the aircraft and the outer tubular member being rotatably and axially movable relative to said fuselage carrying a tail wheel, and fluid disposed in said chamber and the inner tubular member and adapted to pass through said aperture during relative longitudinal movement between said members for providing shock absorbing qualities to said assembly and means for imposing a frictional braking action upon the outer tubular member in its rotation with respect to said inner tubular member.

3. A shock absorbing tail wheel assembly for aircraft comprising inner and outer relatively rotatable and telescopically associated tubular members having closed lower ends, the lower end of the inner member having a restricted aperture therein and being disposed above the lower end of the outer member to form a chamber, the inner tubular member being fixed to the fuselage of the aircraft and the outer tubular member being rotatably and axially movable relative to said fuselage and carrying a tail wheel, a coil spring disposed in said chamber, a quantity of fluid also disposed in the chamber and the inner tubular member and adapted to pass through said aperture during relative longitudinal movement between said members for providing shock absorbing qualities to said assembly and means carried by the outer tubular member for frictionally braking its rotation with respect to the inner tubular member.

4. In an airplane, a fuselage, having a pair of upright members near the after end thereof, a spindle rotatably associated with the fuselage adjacent the upright members and carrying a tail wheel, a brake engaging the spindle and having a projection disposed between said members for preventing rotation of said brake to thereby resist turning movement of the spindle.

5. An airplane embodying therein a ground engaging member, means for mounting the same with respect to the airplane for a pivotal movement in a horizontal direction, and means frictionally engaged with a part of said mounting means for imposing a braking action thereon against such pivotal movement.

6. An airplane embodying therein a ground engaging member, means for mounting the same with respect to the airplane for a pivotal movement in a horizontal direction, and means frictionally engaged with a part of said mounting means for imposing a braking action thereon against such pivotal movement, said braking action being of such magnitude as to prevent oscillation of the landing member about its mounting means when the airplane is in flight but to permit a turning movement of said member when taxiing upon the ground.

7. An airplane embodying therein a ground engaging member, a spindle therefor mounted for a pivotal movement with respect to the airplane and means frictionally engaged with said spindle for imparting a braking action thereon against such pivotal movement, said last mentioned means including parts capable of adjustment to determine the amount of braking action applied to the spindle.

8. An airplane embodying therein relatively rotatable and longitudinally reciprocable members, a ground engaging member carried by one of said members and means frictionally engaging said last mentioned member and imposing that amount of braking influence thereto sufficient to overcome oscillation thereof under windstream action when the airplane is in flight.

9. An airplane embodying therein relatively rotatable and longitudinally reciprocable members, a ground engaging member carried by one of said members, means frictionally engaging said last mentioned member and imposing that amount of braking influence thereto sufficient to overcome oscillation thereof under windstream action when the airplane is in flight and means for preventing turning movement of said frictionally engaging means.

10. An airplane embodying therein a ground engaging member, means for mounting the same with respect to the airplane for a pivotal movement in a horizontal direction as well as a cushioned movement in the plane of its axis and means frictionally engaged with a part of said mounting means for imposing a braking action thereon against such pivotal movement.

11. A tail wheel construction for airplanes embodying therein a tubular tail wheel carrying member, a member fixed with respect to the airplane and on which said tail wheel carrying member is mounted for a longitudinal as well as a swiveling movement, means providing a sleeve on a part of the airplane and through which said tail wheel carrying member extends for a sliding, rotative bearing and shock absorbing means between said tail wheel carrying member and said member fixed with respect to the airplane and means frictionally engaged with the tail wheel carrying member from imposing a braking action thereon against swiveling movement.

12. A tail wheel construction for airplanes embodying therein a tubular tail wheel carrying member, a member fixed with respect to the airplane and on which said tail wheel carrying member is mounted for a longitudinal as well as a swiveling movement, means providing a sleeve on a part of the airplane and through which said tail wheel carrying members extend for a sliding rotative bearing, shock absorbing means between said tail wheel carrying member and said member fixed with respect to said airplane, and frictional means braking the swiveling action of said tail carrying member.

13. A tail wheel construction for airplanes embodying therein a tubular tail wheel carrying member, a member fixed with respect to the airplane and on which said tail wheel carrying member is mounted for a longitudinal as well as a swiveling movement, means providing a sleeve on a part of the airplane and through which said tail wheel carrying members extend for a sliding rotative bearing, shock absorbing means between said tail wheel carrying member and said member fixed with respect to said airplane, and frictional means movable with the tail wheel carrying member and adapted to impart a braking action to the swiveling movement of the tail wheel carrying member.

14. A tail wheel construction for airplanes embodying therein a tubular tail wheel carrying member, a member fixed with respect to the airplane and on which said tail wheel carrying member is mounted for a longitudinal as well as a swiveling movement, means providing a sleeve on a part of the airplane and through which said tail wheel carrying members extend for a sliding rotative bearing, shock absorbing means between said tail wheel carrying member and said member fixed with respect to said airplane, and frictional means carried by said tail wheel carrying member for braking the swiveling action thereon and including a part adapted for engagement with a fixed part of the airplane.

15. A tail wheel construction for airplanes embodying therein a tail wheel carrying member, means fixed with respect to the airplane and upon which said member is mounted for a yielding longitudinal movement and as well as a swiveling movement and means frictionally engaging said tail wheel carrying member and including a part adapted for engagement with a fixed part of the airplane for imposing a braking action to the swiveling movement of said member.

KENNETH M. RONAN.